(12) United States Patent
Jain et al.

(10) Patent No.: US 9,311,799 B2
(45) Date of Patent: Apr. 12, 2016

(54) MODIFYING RFID SYSTEM OPERATION USING MOVEMENT DETECTION

(71) Applicant: SYMBOL TECHNOLOGIES, INC., Lincolnshire, IL (US)

(72) Inventors: Binit Jain, San Jose, CA (US); Randy L Ekl, Lake Zurich, IL (US); Daniel S Griesmann, Villa Park, IL (US); Aparna Pandey, Chicago, IL (US); Miklos Stern, Woodmere, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/217,551

(22) Filed: Mar. 18, 2014

(65) Prior Publication Data

US 2015/0269818 A1  Sep. 24, 2015

(51) Int. Cl.
*G08B 13/14* (2006.01)
*G08B 13/24* (2006.01)
*G06K 7/10* (2006.01)

(52) U.S. Cl.
CPC .......... *G08B 13/248* (2013.01); *G06K 7/10128* (2013.01); *G08B 13/2488* (2013.01)

(58) Field of Classification Search
CPC .......... G06K 7/10079; G06K 7/10178; G06K 19/0723; G06K 19/07749; G06K 19/07758; G06K 2017/0045; G06K 2017/0051; G06K 7/10128; G08B 13/248; G08B 13/2488
USPC .............................................. 340/572.1, 10.1
See application file for complete search history.

(56) References Cited

U.S. PATENT DOCUMENTS

| | | |
|---|---|---|
| 8,380,558 B1 | 2/2013 | Sharma et al. |
| 2005/0073418 A1 | 4/2005 | Kelliher et al. |
| 2006/0064384 A1 | 3/2006 | Mehrotra et al. |
| 2006/0190960 A1 | 8/2006 | Barker |
| 2006/0243798 A1 | 11/2006 | Kundu et al. |
| 2006/0258427 A1 | 11/2006 | Rowe et al. |
| 2009/0322489 A1 | 12/2009 | Jones et al. |
| 2011/0193958 A1 | 8/2011 | Martin et al. |
| 2011/0320322 A1 | 12/2011 | Roslak et al. |
| 2012/0075101 A1* | 3/2012 | Austin et al. ............... 340/572.1 |
| 2013/0099927 A1* | 4/2013 | Kulinets et al. ............ 340/572.1 |
| 2013/0201337 A1 | 8/2013 | Tapp et al. |

FOREIGN PATENT DOCUMENTS

| | | |
|---|---|---|
| WO | 2011063022 A2 | 5/2011 |
| WO | 2012067646 A1 | 5/2012 |

OTHER PUBLICATIONS

International Search Report and Written Opinion mailed May 28, 2015 in counterpart PCT application PCT/US2015/016076.
Xunju Yu, Aura Ganz, "Mass casualty incident surveillance and monitoring using identity aware video analytics", Aug. 31-Sep. 4, 2010, [ages 3755-3758, Website address: http://ieeexplore.ieee.org/stamp/stamp.jsp?arnumber=5627536.

* cited by examiner

*Primary Examiner* — Thomas Mullen

(57) ABSTRACT

A technique for modifying radio frequency identification (RFID) system operation using movement detection includes an RFID scanner disposed within an environment and operable to obtain RFID data from RFID tags located within the environment. An imaging device captures video of the environment, and a processor analyzes the captured video from the imaging device to detect and locate movement within the environment. If movement is detected within the environment, the processor modifies operation of the RFID scanner that is proximal to the location of the movement, increasing or decreasing interrogation rate, for example.

17 Claims, 6 Drawing Sheets

MODIFYING RFID SYSTEM OPERATION USING MOVEMENT DETECTION

BACKGROUND

At present, there are many techniques for the electronic monitoring of the movement of stock, which can be used in many different commercial scenarios, such as a retail establishment, a factory environment, a warehouse environment, etc. These monitoring techniques include the scanning of any one of; a barcode printed on an item, an Electronic Article Surveillance (EAS) tag affixed to the item, Radio Frequency Identification (RFID) tag embedded in the item, and the like.

In particular, retail stores find benefit in maintaining an accurate, up-to-date inventory of items for sale in their establishments. Maintaining inventory counts manually is time consuming, costly, and prone to error. The need for performing these manual inventories can be reduced or eliminated through the use of an automated inventory tracking system. For example, an RFID tag can be placed on each item for which inventory tracking is desired. One or more fixed-position RFID readers can be distributed throughout the store to provide RF coverage of areas where inventory may be located. Each reader can poll for tags and send information about responding tags (e.g. Electronic Product Code, response count, signal strength) to a single central server via a wired or wireless Local Area Network. This server can store a record of the data received over time about each tag from each individual reader. The server can employ algorithms that process these records and periodically use the results to draw inferences about the locations of individual tagged items and whether or not they continue to be part of the store's salable inventory.

Even with these sophisticated techniques, there is still a problem in that RFID technology is not perfectly reliable as the tag reads are not guaranteed. For example, an RFID tag may not be read by any scanner for various reasons even if the tag is within the coverage area of one or more beams. Such reasons can include changes in RF conditions, the tag being in an RF shadow, or the scanners being subject to interference, for example. Further, tag presence and activity in some locations may not be covered by the scanner, i.e. a particular tag can not be observed. Yet another problem may arise where an RFID tag becomes detached from the item it was intended to track.

Accordingly, there is a need for a technique to mitigate the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
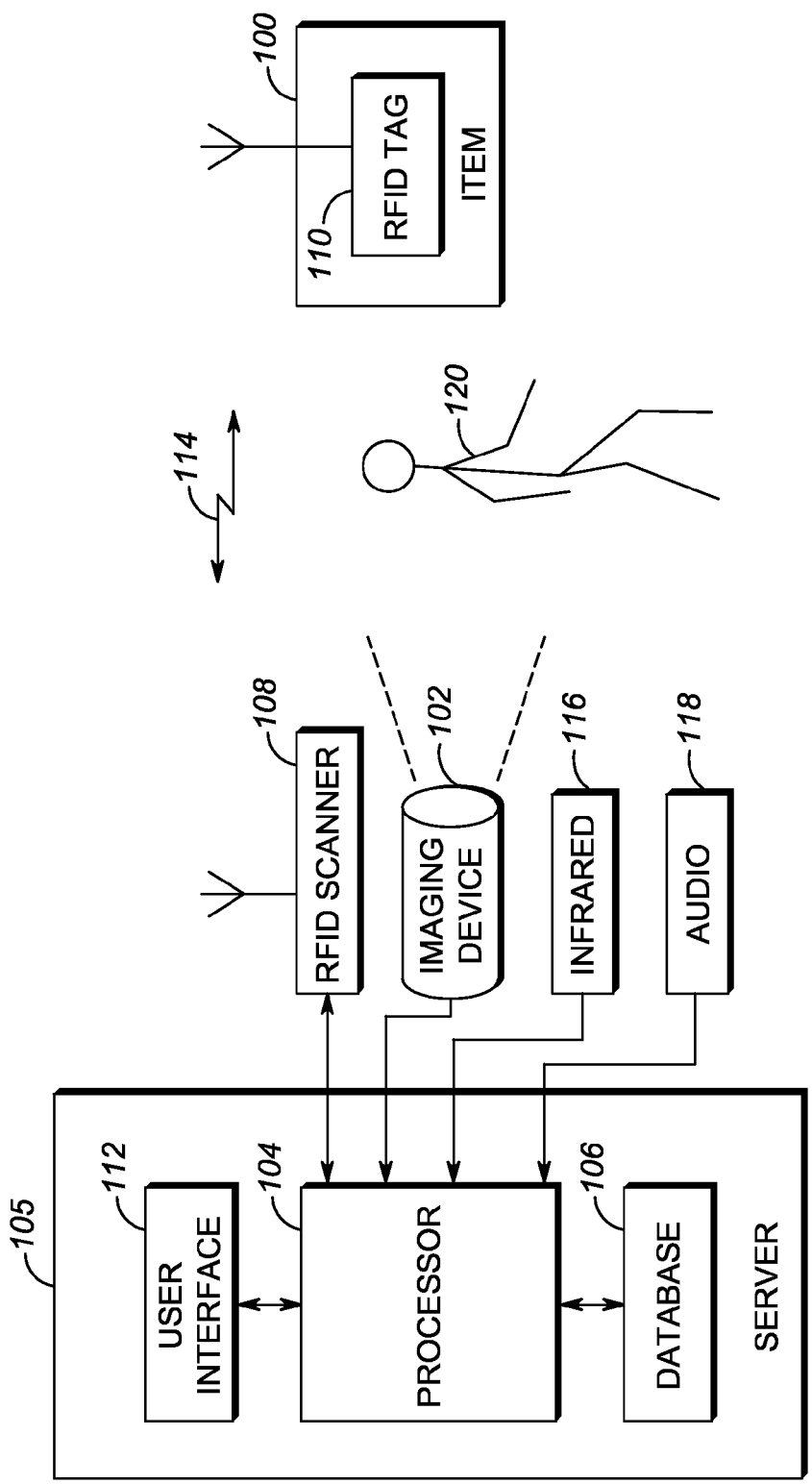
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides an effective technique to utilize video analytics to dynamically modify RFID system operation and improve the overall accuracy of the results from the RFID system. In particular, existing video cameras can be used to form an important part of a retail setup to provide security and real time video surveillance within the store premises. The present invention proposes a technique which makes use of existing live videos already being captured in the store to optimize the performance of the RFID system and improve the overall tag inventory and location results.

In particular, the present invention provides collaboration of one or more of video analytics, audio analytics, and infrared sensors, along with an RFID system, to optimize the performance of the RFID system and improve the overall tag inventory and location results. The present invention enables the use of video analytics to filter erroneous RFID readings and improve the accuracy of the results from the RFID server system. If the video analytics determines there is no customer or associate activity in an area, and yet there are RFID readings of tags moving in that area or the tag being determined to be missing by the RFID system, then the present invention can disregard the RFID readings or correct the results from the RFID server system. The present invention can also detect a difficult-to-find theft of an item when somebody tries to steal an item by removing the tag from the item.

FIG. 1 is a block diagram depiction of a system that can use various optical and wireless communication technologies for RFID data filtering purposes, in accordance with the present invention. The optical systems can include imaging, video, or other optical systems, as are known in the art. The wireless systems can include local and wide-area networks, or other IEEE 802.11 wireless communication system. However, it should be recognized that the present invention is also applicable to many various wireless communication systems. For example, the description that follows can apply to one or more communication networks that are IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.11u (Wi-Fi certified Passpoint™), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the mobile device and access point are preferably compliant with at least the IEEE 802.11 specification.

FIG. 1 shows various entities adapted to support the inventive concepts of the preferred embodiments of the present invention. Those skilled in the art will recognize that FIG. 1 does not depict all of the equipment necessary for system to operate but only those system components and logical entities particularly relevant to the description of embodiments herein. For example, optical systems, tracking devices, servers, and wireless access points can all includes processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the correlation and association aspects of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

Referring back to FIG. 1, an RFID scanner 108 is shown for triggering a radio frequency identification (RFID) scan of an RFID tag 110 affixed to an item 100. The RFID scanner is disposed within an environment, such as a retail store, and operable to obtain RFID data from RFID tags located within the environment. At least one movement detection device is used for detecting any movement in proximity to the item. For example, an imaging device 102 can be used in the analysis of video images for detecting any movement in proximity to the item. The scanner and movement detection device are coupled to a processor 104. The processor can be located in either the movement detection device, the RFID scanner, and/or a remote backend server 105 (as shown), in accordance with the present invention. For example, a video analytics process that receives information from a video camera can either be a part of the backend server or it can be a separate process residing on various entities. The coupling to the server can be accomplished via a wired connection (shown) such as an Ethernet connection, or wireless connection (not shown) such as through access points of a local area network. The server processor 104 is coupled to a memory and/or database 106 and a user interface 112. The system can optionally include an infrared sensor 116 and/or an audio detector 118 coupled to the processor.

The RFID scanner 108 described above uses an RFID wireless air interface 114 for communication with electronic RFID tags 110 that may be affixed to, or embedded within, various different physical items 100, as is known in the art, and is used in the implementation of various embodiments of the present invention. RFID scanners and RFID tags are known to refer to a wide variety of business electronic platforms and can include other devices and functions, as are known in the art and therefore not shown for the sake of simplicity. In one example, the RFID scanner is a ceiling-mounted system with an RFID reader switchably connected between multiple RFID antennas covering different areas of the environment, each antenna providing an RFID scanning beam, i.e. an antenna array reader.

The database 106 includes stored locations of the various RFID scanners within the environment. The database 106 can also be provided with known locations of RFID tagged items within the environment. The database 106 can also be provided with image attributes, or preferably actual images of items, whether RFID-tagged or not. For example, in a store setting, the database 106 can include photographs or image scans of all the items in the store inventory. Even with thousands of different items, the database can remain a reasonable size. If database size, cost, or speed is an issue, only image attributes could be stored. The database 106 can include all inventoried items, or just those with RFID tags, depending on operational preference, memory size, costs, etc. The database 106 can also store associated information about the item, such as its cost, number of items in stock, whether it has an RFID tag, etc.

In one embodiment, the imaging device 102 is used to observe relative locations and movements of the people 120 and/or items within its field of view, and particularly in proximity to tagged items. The imaging device 102 can be a standard video system, a two or three dimensional time-of-flight or structured light depth camera or other optical sensor(s). The imaging device is used to detect movement in the environment. For example, the imaging device and the processor, as part of a video analytics system, can detect activity around a shelf/rack/table of the store, a store associate or a customer just passed through an aisle, merchandise being restocked at a department, a customer browsing merchandise at a section of a department, no activity around a department or area, a customer exiting the store, a direction at which the customer is walking, and quantification of these activities or movements.

The imaging device is part of a standard video analytics system in connection with a backend server 105 and operable to analyze the video captured by the imaging device and detect and locate movement in the video. For example, video analytics can detect people or RFID-tagged item conveyances (i.e. shopping carts) moving around in a store environment by comparing the video to the image attributes or actual images of people and carts in the database 106. Image recognition algorithms are well known in the art, and need not be explained here. Commercially available image recognition software could be used in this instance. In addition, the video analytics system can determine whether an image of an item 100 in the store matches any stored in the database 106. The optical system can be one or more ceiling-mounted cameras, for example, with a clear view of the retail environment. It should be noted that the optical system could be able to visually distinguish features such as a graphic design, shapes, or specific colors of items.

An antenna array RFID reader (AAR) beam scan pattern can be dynamically modified based on the videos of an environment captured from an imaging device such as a video camera. A central server, running RFID tag inventory and tag location algorithms, receives information from one or more video cameras installed within the area of interest. The video cameras will capture the activities or movement of customers, sales associates, particular RFID-tagged items, or a shopping cart within the area in the video and send this video to a video analytics processor, which may or may not be located in the server. The video analytic processor will process and analyze the video to detect and locate movement within the environment, and will create events for the server, which would drive the scan pattern of the RFID reader(s). If the event created for the server indicates that there is some activity or movement within an area, the server will dynamically modify a beam scan pattern for the antenna array of the RFID scanner that is proximal to the location of the movement. For example, the modification for an RFID reader may be to read tags more frequently in that area compared to other areas where there is lesser or no activity or movement. Based on the type of the activity or movement, like a customer spending more time in a department or just passing through a section of a department, the server will determine a duration for which the modified beam scan pattern would be applicable. In this way, the duration for the modification is relative to the amount of movement in the location. The server could also create the modified beam scan pattern that would be applicable until the video analytics determine there is no activity around that location. For example, if the server gets an event from the video analytics processor that a customer is exiting the store, the server can direct the RFID scanner to read tags at the exit until the server asks it not to do so, or the server can direct the RFID scanner to read tags at the exit for the defined period of time. At that point, the RFID scanner would resume its normal scanning of the RFID interrogation beams. In another example, if the server determines based on the input from the video analytics processor that currently the Men's Jeans department has more customer activities or movements as compared to the Men's Shirt department, the server will direct the RFID scanners to spend more time reading at the Men's Jeans department than the Men's Shirt department. The extra amount of time spent reading at the Jeans department will be determined based on the relative amount of activities or movement in each department.

Alternately, if the server gets an event from the video analytics processor that there hasn't been any activity in a particular location, it can instruct the RFID scanners to read less frequently in that location. For example, if it is determined that the activity or movement within the store is low, the server will make one of the decisions of either decreasing the number of interrogations or interrogation rate per beam for all the beams, or selectively decrease the number of interrogations or interrogation rate for some beams which are not reading a critical section of the store like the area at the back of the store, or decreasing the frequency of the beam scanning. The beams reading at the critical section of the store, like the store exit, will either continue to read tags at their normal frequency or the read frequency could be increased at the expense of some interior beams up to a point where no beam is reading below its predefined minimum read frequency.

The present invention can also utilize video analytics to filter erroneous RFID readings and improve the results from the RFID system as a whole. In normal operation, if an RFID tag is not read by any of the beams for a predetermined duration, and the Point-of-Sale (POS) hasn't detected it being sold, the algorithms running within the server will determine that the tag is missing from its location. The server has no means to determine if it was a genuine removal of the tag or a false missing, i.e. the tag is still there in its location, but was not read by any of the beams for a variety of reasons like change in RF condition, the tag is stuck in null beam coverage, an RF shadow, RF interference, etc. But with the help of video analytics, the server can determine if there was any activity around the location of the tag and figure out the potential reasons for the tag not been able to read by any beams. If the server, based on the inputs from the video analytics process, determines there was no customer or associate in that area between the times the tag originally read as present and the time the tag was not found at the last read (i.e. missing), and yet the inventory algorithm running within the server determines that the tag is missing based on the non-reads of the tag by all the beams, the server will disregard the results from the inventory algorithm and will continue to mark the tag in the database as being present at its original location.

Similarly, in case of a tag moving in that area, such as if the RFID scanner is originally able to read an RFID tag at its stored location and then another RFID scanner is able to read that same RFID tag at a different location, and the video analytics process determines that there was no movement or activity of customers or sales associates, the server will again disregard the results from the tag location algorithm for that tag and note in the database that the tag is still present at its previously stored location.

In a further embodiment, if there is a problem using the video analytics system, the server may also receive movement events from an audio detector or audio analytics system that can capture changes in audio level around an area. For example, there are certain places within a store, like the changing room, where video cameras can't be installed. In those places, audio detectors could be more useful. The audio detectors can be attached to the racks, shelves, tables displaying the merchandise or near transition portals. These detectors will capture the audio level around them and send the information to the processor performing audio analytics running within the server. The audio analytics processor will monitor the variation in the audio level and will create movement events for the server if the audio level increases beyond a predetermined threshold.

Along the same lines, if there is a problem using the video analytics system, the server may also receive movement events from infrared sensors, which require direct line of sight to communicate with another infrared sensor. Two infrared sensors can be fixed, one on each side of the aisle. If the line of sight is broken when somebody crosses them, such movement information could be sent to the processor analyzing such occurrence. This processor will then create events informing the server that there is some movement recorded in that aisle.

In certain situations, the server could also keep a record of movement over time to predict a future location of the customer to predict a future location where that movement leads and instruct RFID scanning beams in that future location to read tags more frequently. For example, if the customer is walking on an aisle, the server could deterministically energize those RFID scanning beams which read the part of the aisle in the direction the customer is walking.

The server may also modify additional parameters of the beams based on the inputs from the video analytics processor. These parameters include but not limited to changing between four different read sessions, changing transmit power, changing the number or rate of interrogations, and changing the targeted inventoried flag of the RFID tags between State A or B.

In another embodiment, video analytics can be used to assist the RFID system in detecting the potential theft of an item attached with RFID tag. For example, the RFID system will read the RFID tag attached to an item. Based on the reading (or no reading), the system determines if that item is present or not. One drawback of making such a decision solely based on a tag read (or no read) is that if the tag is removed from the item and left at its location, and the item without the tag is then removed from its location, the RFID system has no way to detect such a situation on its own, as it will continue to read the tag in its location. Video analytics can help to prevent such act. If the video captures a person removing an item from its place, the video analytics process will create an event for the server that an item has been removed from its location. If the RFID system continues to read the same number of tags as before, this could be raised as potential theft alarm for the store associates as the server is sure that an item is removed from its place, but the number of tags read hasn't decreased. In particular, the database can store image attributes of RFID-tagged items, and the processor can detect movement of one of these RFID-tagged items in the environment using the image attributes. If the RFID scanner continues to read the same number of RFID tags at the original location of that one RFID-tagged item being moved, then the processor can raise an alert on the user interface for a store associate to take action.

In certain situations with large tag population, it is very likely that at least one other tag in the area would stop reading around the same time making the case described above look like the stolen item was removed with its tag intact. This limitation could potentially be solved by comparing the SKU (Stock Keeping Unit) or other identification information of the item removed with the one RFID-tagged item which stopped reading. If the video analytics processor indicates to the server that the item removed is of certain SKU or identity, the server can compare this information with the SKU or identity of the item which stopped reading almost around the same time. The server then can make a decision if the item was removed legitimately. For example, if the video analytics process indicates a denim pant was removed from its place, and the RFID system also indicates that a shirt has stopped reading around the same time, the server could determine that the two events are different.

Further, the database can store image attributes of identified RFID-tagged items, and the processor can identify and detect movement of one of these RFID-tagged items in the environment using the image attributes. If the RFID scanner continues to read, at the same location, the RFID tag of that one identified RFID-tagged item being moved, then the processor can raise an alert on the user interface for a store associate to take action.

Video analytics in itself will not be able to conclude this as a theft without the help of the RFID system because the video analytics won't have any means to determine if the item removed was done so without the RFID tag attached to it. The RFID system also won't be able to detect such an act because it will continue to read same number of tags in the system as before. Thus, the video analytics and RFID system are required to work together to flag such kind of potential theft.

Figure 2:
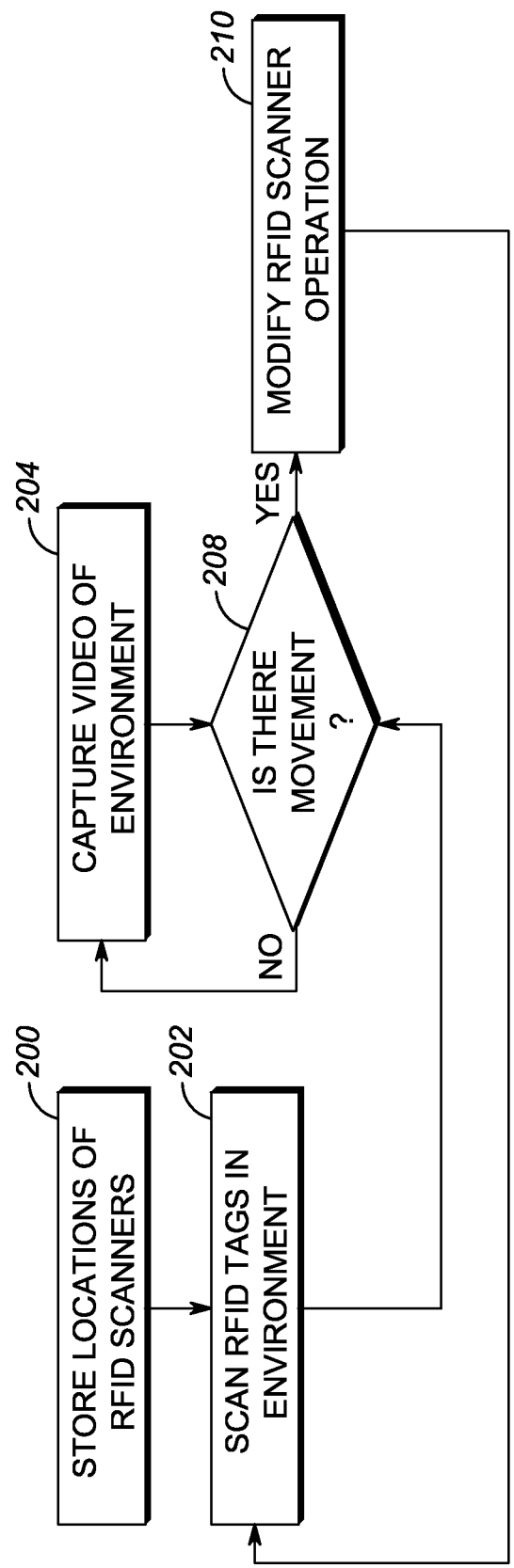
FIG. 2 is a flowchart of a method, in accordance with some embodiments of the present invention.

FIG. 2 illustrates a flowchart of a method for modifying radio frequency identification (RFID) system operation using movement detection, in accordance with the present invention.

The method starts by storing 200 known locations of RFID scanners in an environment. This step can also include storing known locations of RFID tags in the environment. This step can also include storing image attributes of RFID-tagged items.

A next step includes scanning 202 RFID tags located within the environment.

A next step includes capturing 204 video of the environment. This can be done by a video camera coupled to a video analytics system processor. This can also include capturing audio data and/or infrared sensor data.

A next step includes detecting and locating 208 movement within the environment in the captured video. For example, movement can include movement of people, RFID-tagged items, and RFID-tagged item conveyances, such as a cart, in the environment. Further, an audio detection system can be used in a localized area of the environment, wherein if audio is detected greater than a predetermined threshold, then movement is indicated in that localized area. Also, an infrared sensor system can be used in a localized area of the environment, wherein if the infrared sensor system is triggered, then movement is indicated in that localized area.

A next step includes modifying 210 operation of the RFID scanner that is proximal to the location of the movement. This step can include dynamically modifying a beam scan pattern of the RFID scanner such that the RFID scanner scans for RFID tags more frequently in the location of the movement compared to RFID scanners in other areas in the environment where there is lesser or no movement. This step can also include dynamically modifying a beam scan pattern of those RFID scanners proximal to locations with no detected movement by directing those RFID scanners to scan for RFID tags less frequently in those locations of no detected movement compared to RFID scanners in other areas in the environment where there is some movement. The actual modification can include changing the rate of interrogations or transmit power of the RFID scanner over time.

Figure 3:
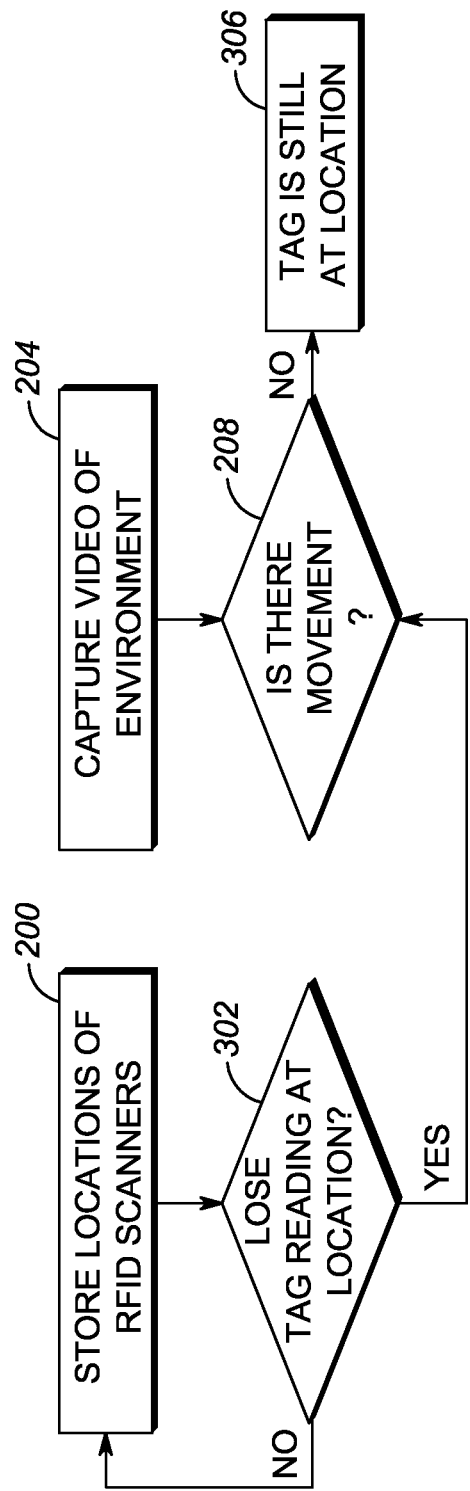
FIG. 3 is a flowchart of a method, in accordance with other embodiments of the present invention.

Referring to FIG. 3, in a further embodiment, if the RFID scanner is originally able to read an RFID tag at its stored location and then is unable to read that same RFID tag at that same location 302, and the processor detects no movement between these two events 208, then the database will not be changed, indicating that the RFID tag is still present at that location 306, and no modification of the RFID scanner operation is needed (i.e. 210).

Figure 4:
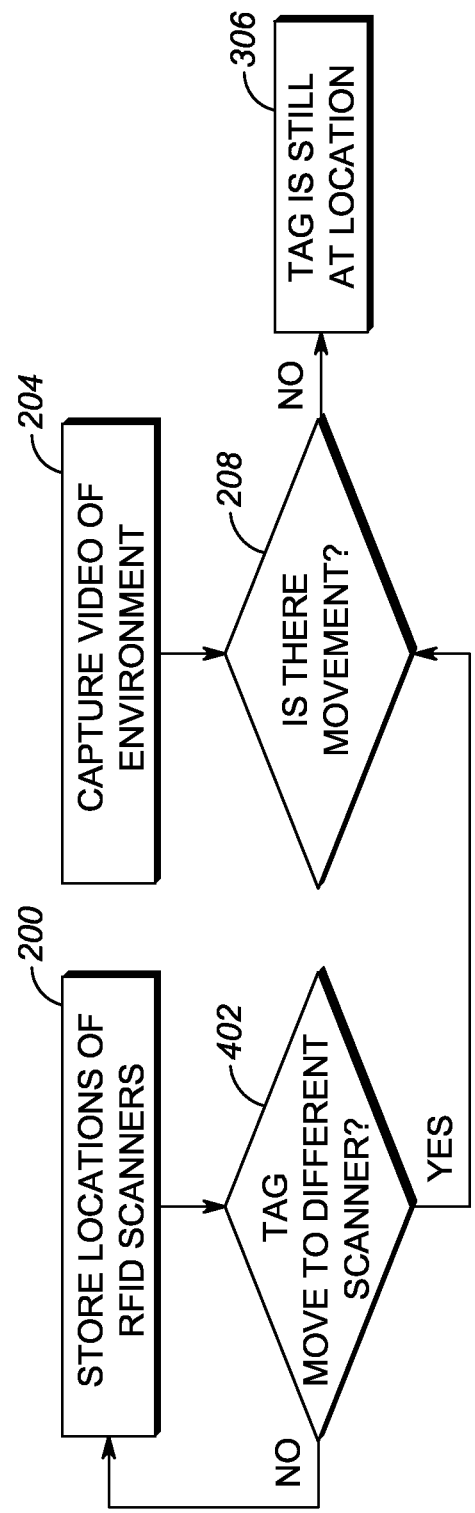
FIG. 4 is a flowchart of a method, in accordance with yet other embodiments of the present invention.

Referring to FIG. 4, in another further embodiment, if the RFID scanner is originally able to read an RFID tag at its stored location and then another RFID scanner is able to read that same RFID tag at a different location 402, and the processor detects no movement between these two events 208, then the database will not be changed, indicating that the RFID tag is still present at its previously stored location 306, and no modification of the RFID scanner operation is needed (i.e. 210).

Referring back to FIG. 2, in yet another embodiment, the method keeps a record of movement 208 over time to predict a future location where that movement leads in order to modify operation of the at least one RFID scanner 210 that is proximal to the future location of the movement.

Figure 5:
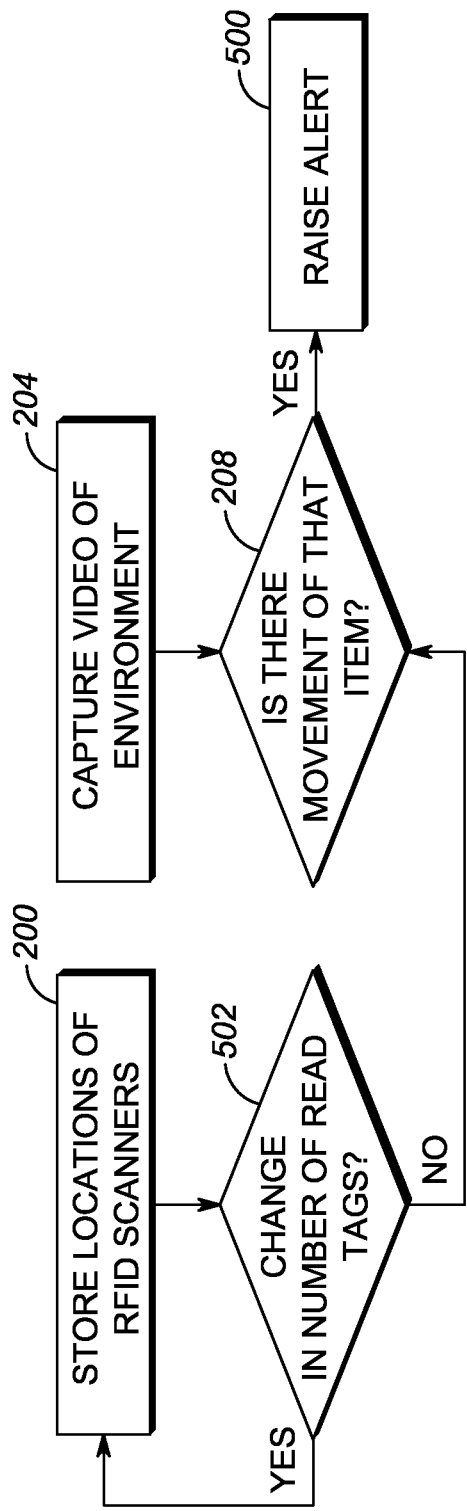
FIG. 5 is a flowchart of a method, in accordance with yet other embodiments of the present invention.

Referring to FIG. 5, in another further embodiment, the method detects movement 208 of one of these RFID-tagged items in the environment using the stored image attributes or recognized SKU number of that item, and wherein if the RFID scanner is continues to read the same number of RFID tags 502 at the location of that one RFID-tagged item being moved, then the method can raise an alert 500 on the user interface.

Figure 6:
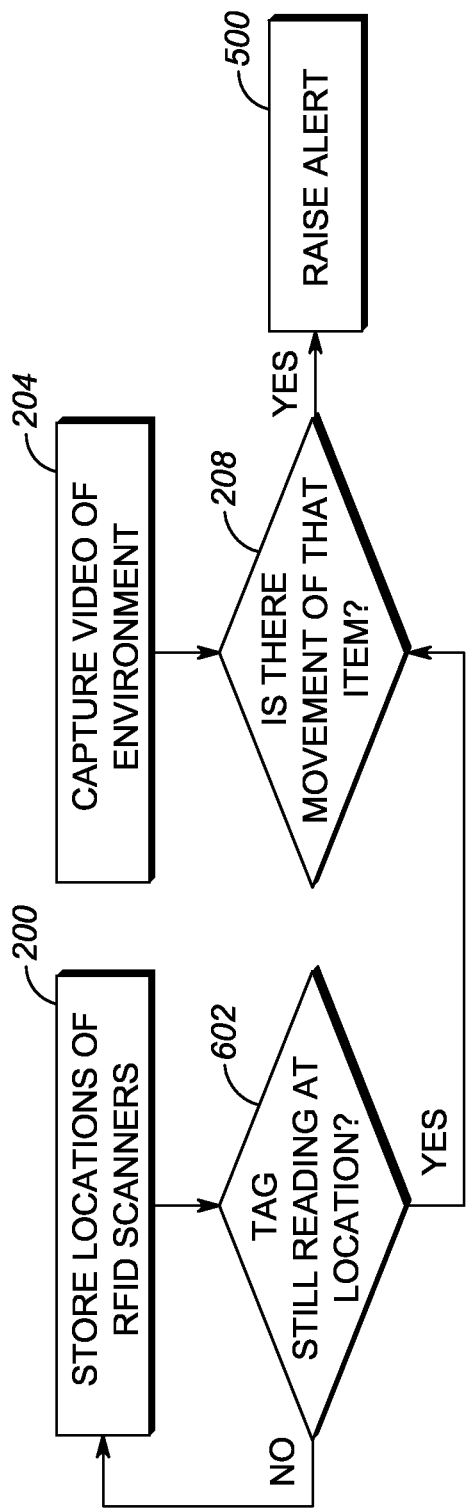
FIG. 6 is a flowchart of a method, in accordance with yet other embodiments of the present invention.

Referring to FIG. 6, in another further embodiment, the method identifies and detects movement 208 of one of these RFID-tagged items in the environment using the stored image attributes or recognized SKU number of that item, and wherein if the RFID scanner continues to read 602, at the same location, the RFID tag of that one identified RFID-tagged item being moved, then the method can raise an alert 500 on the user interface In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for modifying radio frequency identification (RFID) system operation using movement detection, the system comprising:

at least one RFID scanner disposed within an environment and operable to obtain RFID data from RFID tags located within the environment;

at least one movement detection device operable for capturing movement within the environment; and a processor coupled to the at least one RFID scanner and the at least one movement detection device, the processor also coupled to a user interface and a database containing known locations of the at least one RFID scanner in the environment, the processor operable to analyze the captured movement from the movement detection device to detect and locate movement within the environment;

wherein, if movement is detected within the environment, the processor is further operable to modify operation of the RFID scanner that is proximal to the location of the movement, wherein the database also stores locations of RFID tags in the environment, and wherein if the at least one RFID scanner is originally able to read an RFID tag at its stored location and then:

when the at least one RFID scanner is unable to read that same RFID tag at that same location, and the processor detects no movement between these two events, then the database will not be changed, indicating that the RFID tag is still present at that location; or, when a further RFID scanner is able to read that same RFID tag at a different location, and the processor detects no movement between these two events, then the database will not be changed, indicating that the RFID tag is still present at its previously stored location.

2. The system of claim 1, wherein the processor dynamically modifies a beam scan pattern of the at least one RFID scanner such that the at least one RFID scanner scans for RFID tags more frequently in the location of the movement compared to further RFID scanners in other areas in the environment where there is lesser or no movement.

3. The system of claim 2, wherein a duration of the modification is relative to the amount of movement in the location.

4. The system of claim 2, wherein the processor dynamically modifies a beam scan pattern of those RFID scanners proximal to locations with no detected movement by directing those RFID scanners to scan for RFID tags less frequently in those locations of no detected movement compared to RFID scanners in other areas in the environment where there is some movement.

5. The system of claim 2, wherein the modification includes changing the rate of interrogations of the at least one RFID scanner over time.

6. The system of claim 1, wherein the at least one movement detection device includes an imaging device for capturing video of the environment and the processor is part of a video analytics system.

7. The system of claim 6, wherein the database also stores image attributes of RFID-tagged items, and wherein the processor can detect movement of one of these RFID-tagged items in the environment using the image attributes, and wherein if the at least one RFID scanner continues to read the same number of RFID tags at the location of that one RFID-tagged item being moved, then the processor can raise an alert on the user interface.

8. The system of claim 6, wherein the database also stores image attributes of identified RFID-tagged items, and wherein the processor can identify and detect movement of one of these RFID-tagged items in the environment using the image attributes, and wherein if the at least one RFID scanner continues to read, at the same location, the RFID tag of that one identified RFID-tagged item being moved, then the processor can raise an alert on the user interface.

9. The system of claim 1, wherein the processor is further operable to analyze the captured movement to detect movement of people and RFID-tagged items in the environment.

10. The system of claim 1, wherein the at least one movement detection device includes an audio detection system coupled to the processor and installed in a localized area of the environment, wherein if audio is detected greater than a predetermined threshold, then movement is indicated in that localized area by the audio detection system to the processor.

11. The system of claim 1, wherein the at least one movement detection device includes an infrared sensor system coupled to the processor and installed in a localized area of the environment, wherein if the infrared sensor system is triggered, then movement is indicated in that localized area by the infrared sensor system to the processor.

12. The system of claim 1, wherein the processor is further operable to keep a record of movement over time to predict a future location where that movement leads in order to modify operation of one or more of a plurality of RFID scanners, including the at least one RFID scanner, that is proximal to the future location of the movement.

13. The system of claim 1, wherein the modification includes changing the transmit power of the RFID scanner over time.

14. The system of claim 1, wherein the at least one movement detection device includes one or more of an imaging device, an audio detection device, and an infrared device.

15. A system for modifying radio frequency identification (RFID) system operation using movement detection, the system comprising:
at least one RFID scanner disposed within an environment and operable to obtain RFID data from RFID tags located within the environment;
at least one imaging device operable for capturing video of the environment; and
a processor coupled to the at least one RFID scanner and the at least one imaging device, the processor also coupled to a user interface and a database containing known locations of the at least one RFID scanner in the environment, the processor being part of a video analytics system, the processor operable to analyze the captured video from the at least one imaging device to detect and locate movement within the environment;
wherein, if movement is detected within the environment, the processor is further operable to modify operation of the RFID scanner that is proximal to the location of the movement,
wherein the database also stores image attributes of RFID-tagged items,
and wherein the processor is further operable to one or more of:
detect movement of one of these RFID-tagged items in the environment using the image attributes, and wherein if the at least one RFID scanner continues to read the same number of RFID tags at the location of that one RFID-tagged item being moved, then the processor can raise an alert on the user interface; and,
identify and detect movement of one of these RFID-tagged items in the environment using the image attributes, and wherein if the at least one RFID scanner continues to read, at the same location, the RFID tag of that one identified RFID-tagged item being moved, then the processor can raise the alert on the user interface.

16. A method for modifying radio frequency identification (RFID) system operation using movement detection, the method comprising:
storing, in a database, known locations of at least one RFID scanner in an environment and locations of RFID tags in the environment, the at least one RFID scanner operable to obtain RFID data from the RFID tags located within the environment;
scanning, using one or more of the at least one RFID scanner, the RFID tags located within the environment;
capturing, using at least one movement detection device, movement within the environment;
analyzing, using a processor coupled to the at least one RFID scanner, the at least one movement detection device, and the database, the captured movement from the movement detection device to detect and locate movement within the environment; and
if movement is detected within the environment, modifying, using the processor operation of the RFID scanner that is proximal to the location of the movement wherein if the at least one RFID scanner is originally able to read an RFID tag at its stored location and then:
when the at least one RFID scanner is unable to read that same RFID tag at that same location, and the processor detects no movement between these two events, then the database will not be changed, indicating that the RFID tag is still present at that location; or, when a further RFID scanner is able to read that same RFID tag at a different location, and the processor detects no movement between these two events, then the database will not be changed, indicating that the RFID tag is still present at its previously stored location.

17. A method for modifying radio frequency identification (RFID) system operation using movement detection, the method comprising:

storing, in a database, known locations of at least one RFID scanner in an environment and image attributes of RFID-tagged items, the at least one RFID scanner operable to obtain RFID data from RFID tags located within the environment;

scanning, using one or more of the at least one RFID scanner, the RFID tags located within the environment;

capturing, using at least one imaging device, video within the environment;

analyzing, using a processor coupled to the at least one RFID scanner, the at least one imaging device, the database, and a user interface, the video from the at least one imaging device to detect and locate movement within the environment;

if movement is detected within the environment, modifying, using the processor, operation of the RFID scanner that is proximal to the location of the movement;

detecting, using the processor, movement of one of these RFID-tagged items in the environment using the image attributes, and wherein if the at least one RFID scanner continues to read the same number of RFID tags at the location of that one RFID-tagged item being moved, then raising, using the processor, an alert on the user interface; and, identifying and detecting, using the processor, the movement of one of these RFID-tagged items in the environment using the image attributes, and wherein if the at least one RFID scanner continues to read, at the same location, the RFID tag of that one identified RFID-tagged item being moved, then raising, using the processor, an alert on the user interface.

* * * * *